United States Patent
Kuczek et al.

(10) Patent No.: US 12,123,085 B2
(45) Date of Patent: Oct. 22, 2024

(54) SURFACE TREATMENT SYSTEM DESIGN FOR HIGH FATIGUE LIFE HOLLOW FAN BLADES

(71) Applicant: Raytheon Technologies Corporation, Farmington, CT (US)

(72) Inventors: Andrzej E. Kuczek, Bristol, CT (US); Tahany El-Wardany, Vernon, CT (US); Benjamin Bedard, Manchester, CT (US); Michael A Klecka, Coventry, CT (US); Randy P. Salva, Baltic, CT (US); Krzysztof Barnat, Berlin, CT (US)

(73) Assignee: RTX Corporation, Farmington, CT (US)

( * ) Notice: Subject to any disclaimer, the term of this patent is extended or adjusted under 35 U.S.C. 154(b) by 247 days.

(21) Appl. No.: 17/892,541

(22) Filed: Aug. 22, 2022

(65) Prior Publication Data

US 2024/0060165 A1    Feb. 22, 2024

(51) Int. Cl.
| | |
|---|---|
| C22F 1/04 | (2006.01) |
| B23Q 1/40 | (2006.01) |
| F01D 5/14 | (2006.01) |
| F01D 25/28 | (2006.01) |

(52) U.S. Cl.
CPC ............. *C22F 1/04* (2013.01); *B23Q 1/40* (2013.01); *F01D 5/147* (2013.01); *F01D 25/285* (2013.01); *B23B 2270/26* (2013.01); *F05D 2220/32* (2013.01); *F05D 2230/26* (2013.01); *Y10T 29/49998* (2015.01)

(58) Field of Classification Search
CPC ... B23Q 1/40; C22F 1/04; F01D 5/147; F01D 25/285; B23B 2270/26; F05D 2220/32; F05D 2230/26; Y10T 29/49998
See application file for complete search history.

(56) References Cited

U.S. PATENT DOCUMENTS

| | | | |
|---|---|---|---|
| 9,517,502 B2 * | 12/2016 | Di Stefano | ............ B25J 13/085 |
| 10,786,883 B2 | 9/2020 | Hawkes et al. | |
| 2017/0056953 A1 * | 3/2017 | Serpi | ................ B21D 39/023 |
| 2018/0171447 A1 * | 6/2018 | Hawkes | ................ B25J 13/085 |
| 2018/0171448 A1 | 6/2018 | Hawkes et al. | |

FOREIGN PATENT DOCUMENTS

| | | | | |
|---|---|---|---|---|
| GB | 786727 A | * | 5/1954 | |
| WO | WO-2022011845 A1 | * | 1/2022 | ............... C21D 7/04 |

* cited by examiner

*Primary Examiner* — Bayan Salone
(74) *Attorney, Agent, or Firm* — Bachman & LaPointe, P.C.

(57) ABSTRACT

A system for deep rolling a fan blade including a shaft assembly disposed along a first axis; a hub connected to a distal end of the shaft assembly, the hub having an upper hub portion and a lower hub portion extending along a second axis, the second axis forming an angle relative to a first axis; a roller disk joined to the lower portion of the hub, the roller disk configured to contact a fan blade; a fixture supporting the fan blade; the fixture comprising a body supporting a pivot clamp attached to the body with a pivot; a support attached to the body, the support is configured to engage an airfoil portion of the fan blade; a receiver formed in the body for supporting a root of the fan blade; and a shoulder attached to the body configured to support a platform portion of the fan blade.

20 Claims, 9 Drawing Sheets

SURFACE TREATMENT SYSTEM DESIGN FOR HIGH FATIGUE LIFE HOLLOW FAN BLADES

BACKGROUND

The present disclosure is directed to a system for deep rolling surfaces of a hollow fan blade. Particularly, a deep rolling (DR) process can be used on aluminum fan blade roots to improve damage tolerance from corrosion. This can increase fatigue life or maintain fatigue life in the presence of damage.

Mechanical surface treatments are applied to alter surface strength & enhance fatigue life. Deep Rolling (DR) is a type of surface treatment. The Deep Rolling process uses a roller to roll the surface under controlled load & speed. The rolling pressure induces a deep layer of compressive residual stress. Mechanical surface treatments, such as Deep Rolling, shot peening and laser shock peening, can significantly improve the fatigue behavior of highly-stressed metallic components. Deep rolling is particularly attractive since it is possible to generate, near the surface, deep compressive residual stresses and work hardened layers while retaining a relatively smooth surface finish.

Hydraulic burnishing tools for complex geometries utilize a ball bearing at the end of an axisymmetric, hydraulically actuated shaft. However, this tool is expensive and it involves complex processing steps. Further, despite its relatively high precision, the small surface area of a ball bearing unnecessarily slows production time and throughput. These known tools also cannot be readily used with widely available machine tools due to the need to maintain and constantly adjust hydraulic pressure on the bearing surface. In addition there is a need for a post processing to clean the treated surface from the oil residue left on the surface.

An alternative process includes a dry deep rolling process, which can induce high compressive stresses up to 1.5 mm depth from the surface of a material through localized plastic deformation to prevent corrosion pits, foreign object damage, and crack initiation.

Controlling the contact stress between the roller and material being processed is important to achieving desired improvements in material properties. With insufficient contact stress, little or no improvement will be achieved. In addition, there is also a need to customize the applied load and consequently the contact stress along the deep rolling path. Too high of a contact stress can damage the material on/near the surface resulting in a decrement in properties. Avoiding collision between the deep rolling tool and the fan blade is desired to prevent the creation of defects in the blade or scrapping the blade.

What is needed is a deep rolling system that includes a fixture to mount the fan blade that enables proper processing and a generation of good multi axes tool path.

SUMMARY

In accordance with the present disclosure, there is provided a system for deep rolling a fan blade comprising a shaft assembly disposed along a first axis; a hub connected to a distal end of the shaft assembly, the hub having an upper hub portion adjacent to the distal end of the shaft assembly aligned with the first axis, and a lower hub portion extending along a second axis, the second axis forming an angle relative to the first axis; a roller disk joined to the lower portion of the hub, the roller disk configured to contact a fan blade; a fixture supporting the fan blade; the fixture comprising a body supporting a pivot clamp, the pivot clamp attached to the body with a pivot; a support attached to the body, the support is configured to engage an airfoil portion of the fan blade; a receiver formed in the body configured to support a root of the fan blade; and a shoulder attached to the body configured to support a platform portion of the fan blade.

A further embodiment of any of the foregoing embodiments may additionally and/or alternatively include the pivot clamp includes an adjustable clamp, the adjustable clamp being adjustably mounted through an arm of the pivot clamp attached to the pivot.

A further embodiment of any of the foregoing embodiments may additionally and/or alternatively include the support extends upward relative to an upper region of the body to engage the airfoil portion of the fan blade; the support includes at least one brace coupled to a rear of the body, the at least one brace includes an adjustable strut.

A further embodiment of any of the foregoing embodiments may additionally and/or alternatively include the receiver includes at least one landing configured to support a corresponding portion of the root.

A further embodiment of any of the foregoing embodiments may additionally and/or alternatively include the system for deep rolling a fan blade further comprising a lug that extends outward from the receiver to brace the root.

A further embodiment of any of the foregoing embodiments may additionally and/or alternatively include the shoulder is located in an upper region of the body between the receiver and the support.

A further embodiment of any of the foregoing embodiments may additionally and/or alternatively include the adjustable clamp includes a hand knob and a surface contactor opposite the hand knob along a shaft of the adjustable clamp; wherein the surface contactor is configured to press against a portion of the fan blade to secure the fan blade.

In accordance with the present disclosure, there is provided a system for deep rolling a fan blade comprising a shaft assembly disposed along a first axis; a hub connected to a distal end of the shaft assembly, the hub having an upper hub portion adjacent to the distal end of the shaft assembly aligned with the first axis, and a lower hub portion extending along a second axis, the second axis forming an angle relative to the first axis; a roller disk joined to the lower portion of the hub, the roller disk configured to contact a fan blade; a fixture supporting the fan blade; the fixture comprising a body including an upper region opposite a lower region, the body includes a front and a rear opposite the front, the body includes a right side and a left side opposite the right side; the body supports a pivot clamp, the pivot clamp attaches to the body with a pivot attached to the body; a support attached to the body, the support includes at least one brace coupled to the rear of the body, the support is configured to engage an airfoil portion of the fan blade; a receiver formed in the body configured to support a root of the fan blade, wherein the receiver includes at least one landing configured to support a corresponding portion of the root; and a shoulder attached to the body configured to support a platform portion of the fan blade; wherein the shoulder is located in an upper region of the body between the receiver and the support.

A further embodiment of any of the foregoing embodiments may additionally and/or alternatively include pivot clamp includes an adjustable clamp, the adjustable clamp being adjustably mounted through an arm of the pivot clamp attached to the pivot.

A further embodiment of any of the foregoing embodiments may additionally and/or alternatively include the adjustable clamp includes a knob and a surface contactor opposite the knob along a shaft of the adjustable clamp.

A further embodiment of any of the foregoing embodiments may additionally and/or alternatively include the surface contactor is configured to press against a portion of the fan blade to secure the fan blade.

A further embodiment of any of the foregoing embodiments may additionally and/or alternatively include the at least one brace includes an adjustable strut.

A further embodiment of any of the foregoing embodiments may additionally and/or alternatively include the system for deep rolling a fan blade further comprising a lug that extends outward from the receiver to brace the root.

In accordance with the present disclosure, there is provided a process for securing a fan blade for deep rolling comprising supporting the fan blade in a fixture, the fixture comprising a body supporting a pivot clamp, the pivot clamp attached to the body with a pivot; engaging an airfoil portion of the fan blade with a support attached to the body; supporting a root of the fan blade with a receiver formed in the body; and supporting a platform portion of the fan blade with a shoulder attached to the body.

A further embodiment of any of the foregoing embodiments may additionally and/or alternatively include the pivot clamp includes an adjustable clamp, the adjustable clamp being adjustably mounted through an arm of the pivot clamp attached to the pivot.

A further embodiment of any of the foregoing embodiments may additionally and/or alternatively include the process further comprising supporting a portion of the root with at least one landing formed in the receiver.

A further embodiment of any of the foregoing embodiments may additionally and/or alternatively include the process further comprising bracing the root of the fan blade with a lug that extends outward from the receiver.

A further embodiment of any of the foregoing embodiments may additionally and/or alternatively include the adjustable clamp includes a knob and a surface contactor opposite the knob along a shaft of the adjustable clamp.

A further embodiment of any of the foregoing embodiments may additionally and/or alternatively include the process further comprising pressing the surface contactor against a portion of the fan blade to secure the fan blade.

A further embodiment of any of the foregoing embodiments may additionally and/or alternatively include the support includes at least one brace coupled to a rear of the body, wherein the at least one brace includes an adjustable strut; and adjusting the adjustable strut to contact the airfoil portion of the fan blade.

Other details of the system for deep rolling are set forth in the following detailed description and the accompanying drawings wherein like reference numerals depict like elements.

DETAILED DESCRIPTION

Generally, a roller disk with a crowned or otherwise nonplanar working surface about its perimeter can be attached to an end of a spring-loaded shaft. The tool can be attached to a device to process one or more parts. The tool uses multiple tool passes to induce residual compressive stresses while maintaining the appropriate level or range of contact stresses at the roller's point of contact via selective spring loading of the tool. A fixture is utilized to secure the part for use of the tool to perform the deep rolling.

Figure 1:
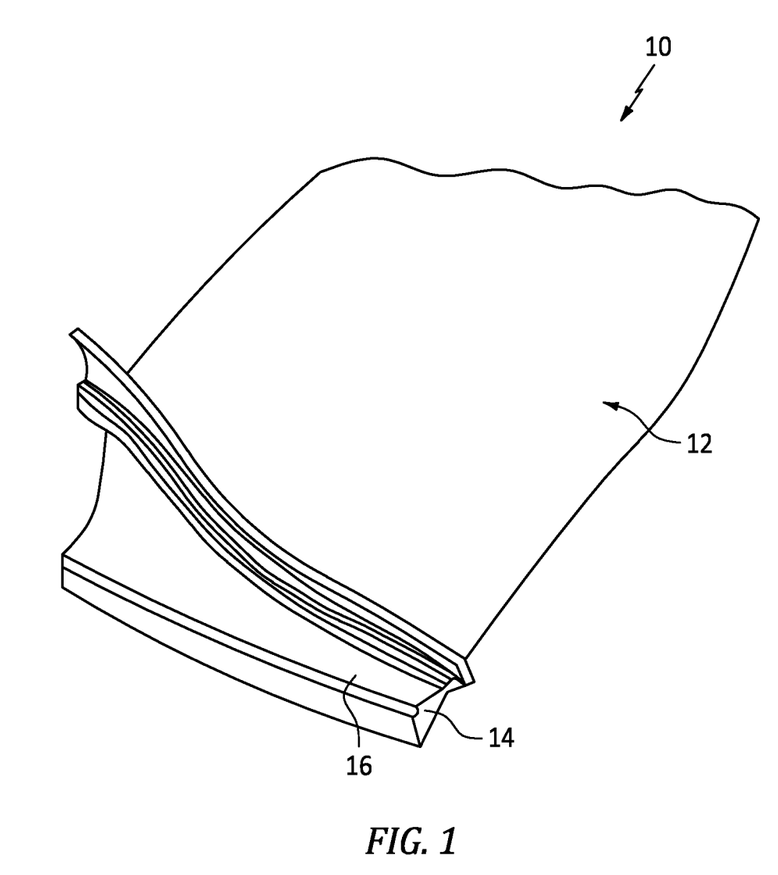
FIG. 1 is a perspective view of a dovetail root portion of a gas turbine engine fan blade.

FIG. 1 shows workpiece 10, which can be supported in a suitable fixture (not shown). Workpiece 10 has airfoil 12 and dovetail root 14. At least one nonplanar surface is to be processed (e.g., junction 16 between airfoil 12 and root 14) to have residual compressive stresses near the surface in and around junction 16.

In this example, workpiece 10 is an aluminum alloy hollow fan blade for a turbofan engine, but the process can be adapted to nearly any workpiece having a nonplanar surface into which residual compression stresses are desired to be incorporated.

Thus in the example of a dovetail-rooted blade, it is desired to increase residual compressive stresses around both sides of junction 16 between dovetail root 14 and airfoil 12. As most of the bending stresses are concentrated around junction 16, this location is most prone to fatigue damage. The combined effects of fatigue and corrosion pitting can be reduced via deep rolling because the residual compressive stress induced by application of the rolling tool (shown in subsequent figures) reduces the pathways for damage to propagate through the part, extending the time before failure or replacement.

Figure 2:
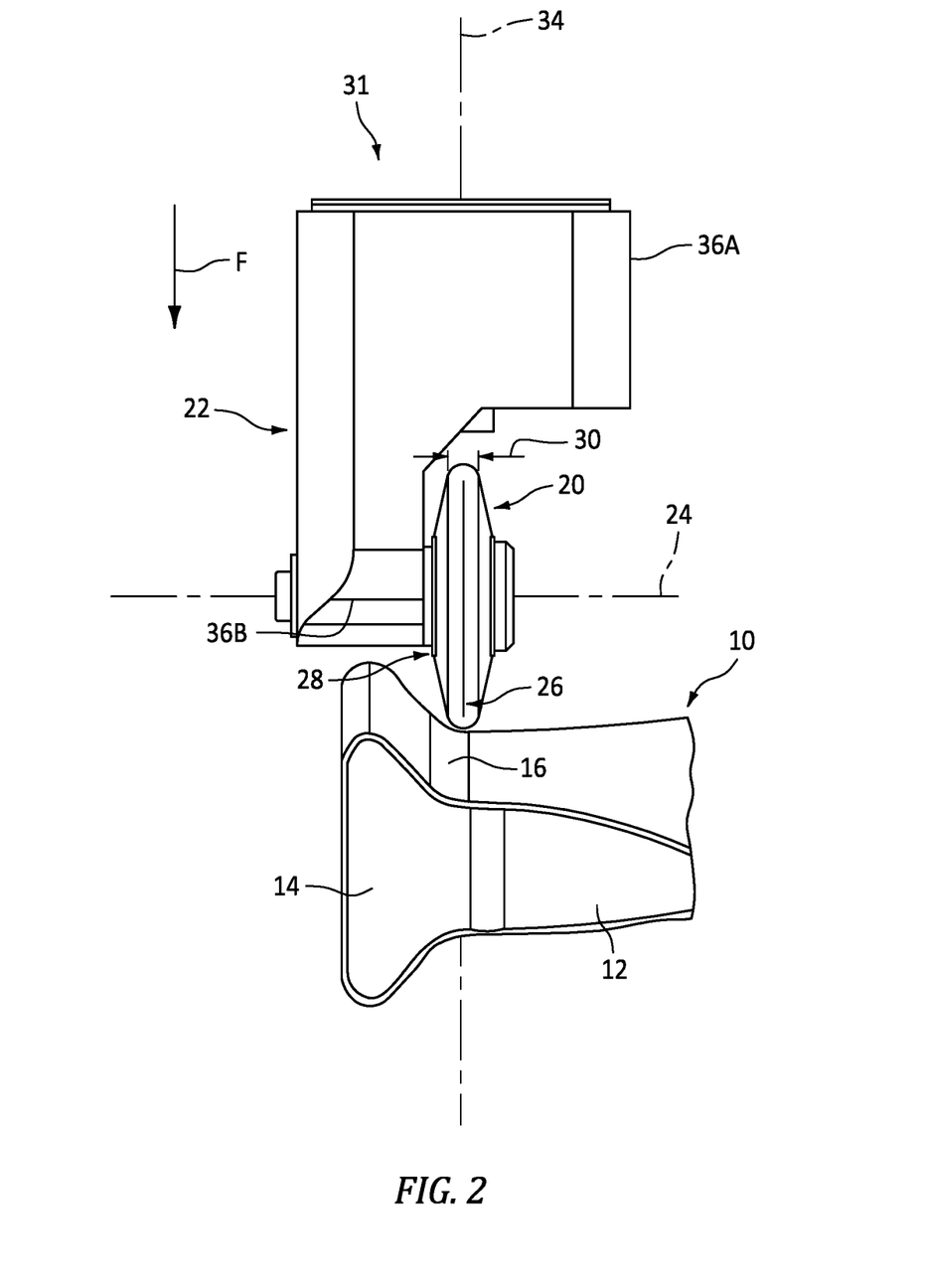
FIG. 2 shows a roller processing a workpiece such as a blade root shown in FIG. 1.

FIG. 2 shows roller disk 20 processing junction 16 of workpiece/blade 10 between airfoil 12 and root 14. Disk 20 can be joined to a portion of hub 22 with roller disk 20 rotatable about an axis 24 angled relative to a downward force direction F. Here, axis 24 is normal to downward force direction F and thus, resulting downward contact force is applied to junction 16 generally in direction F as well.

Disk 20 has working surface 26 about its perimeter 28, and can include a profile along its width 30 (best seen in FIGS. 3 and 4), such that an effective radius of the roller disk varies along a width thereof. It can be seen in FIG. 2 that the disk should be of a radius that provides clearance over protruding regions of the workpiece (e.g., dovetail root 14). In a conventional arrangement for processing a modern aluminum fan blade dovetail, this requires a minimum disk radius of about 2 inches (51 cm), but the size will vary depending on a particular application.

Figure 3:
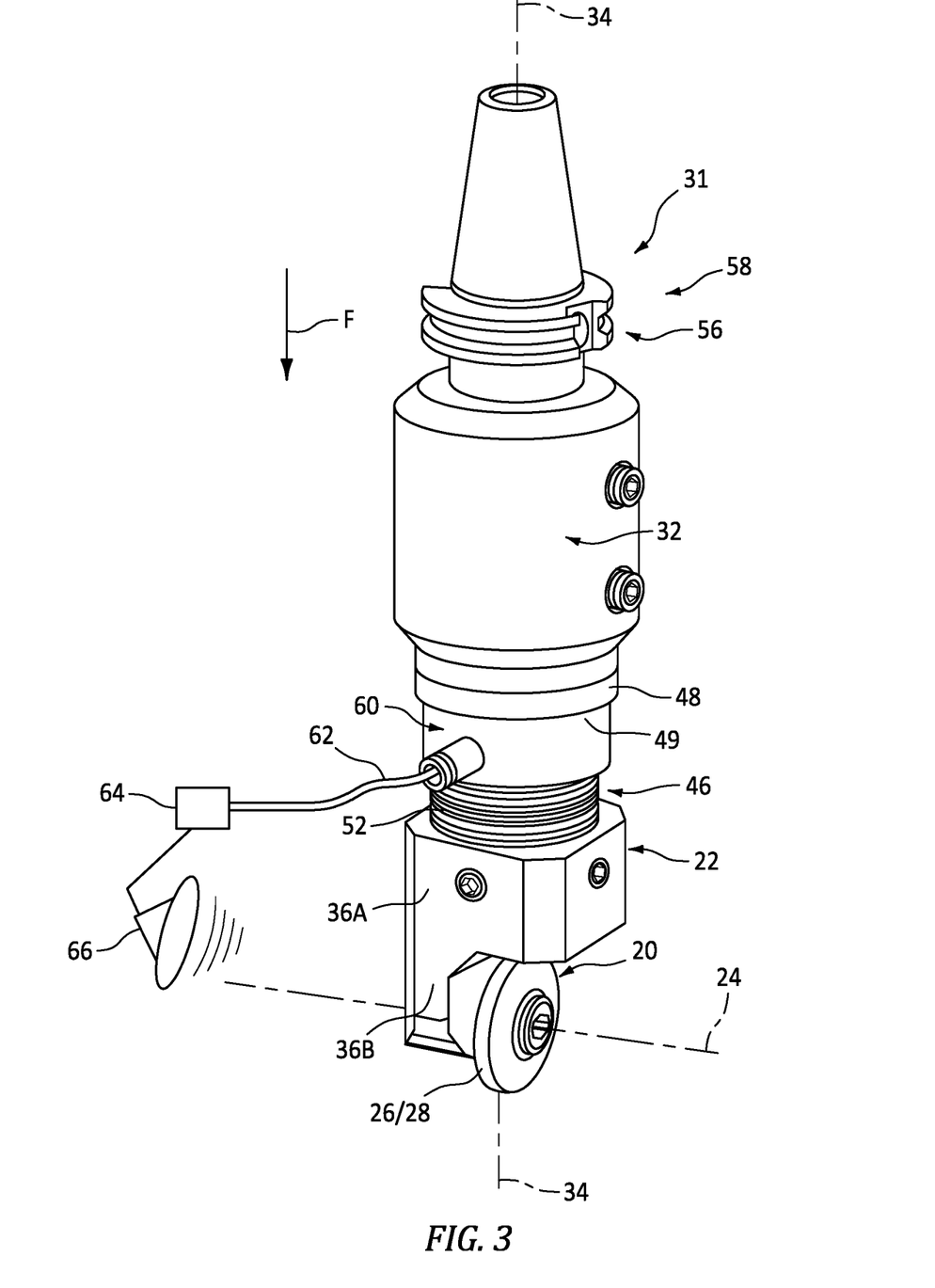
FIG. 3 is a perspective view of an embodiment of a deep rolling tool.

Hub 22 connects disk 20 to a shaft through which the downward force can be applied in direction F. One example embodiment of a deep rolling tool incorporating this construction is shown in FIG. 3. Tool assembly 31 includes spring-loaded shaft assembly 32 disposed along axis 34, which is parallel to downward force direction F. Hub 22 can have a first/upper portion 36A along axis 34 and a second/lower portion 36B at a nonzero angle relative to axis 34. This angle is therefore consistent with the nonzero angle between axis 24 and direction F.

Operation of tool assembly 31 can be as follows. The rolling operation can include applying a force in direction F along axis 34 such that the applied force is transferred through spring-loaded shaft assembly 32, hub 22, and roller disk 20 to a first nonplanar surface of the workpiece (e.g., junction 16). The resulting force applied to the first nonplanar surface varies along the width of working surface 26 of the disk due to the variable profile across width 30 (seen in FIG. 2).

At least one rolling operation can be performed on a nonplanar surface using a tool like that shown in FIG. 3. FIG. 3 depicts roller disk 20 joined to second/lower portion 36B of hub 22, and which is rotatable about axis 24 through second/lower portion 36B of hub 22. Roller disk 20 can be supported on one or more bearings (best seen in the exploded view of FIG. 4). As noted with respect to FIG. 2, disk 20 can have working surface 26 about perimeter 28 and can include a variable or crowned profile. As a result, an effective radius (and thus applied bearing stresses) of roller disk 20 varies along working surface 26. Though shown as a crowned roller with a single center peak, working surface 26 can additionally have one or more peaks, troughs, etc. The resulting profile can thus either be curved, slanted, or flat.

Spring-loaded shaft assembly 32 can take several different forms. In one non-limiting example, resilient element 46 is disposed at distal end 48 of shaft assembly 32, while a rigid shaft 50 (best seen in FIG. 4) can be supported on a device to restrain its movement only along first axis. This can include one or more linear bearings 49. In other embodiments, shaft assembly 32 can include a flexible beam without a separate resilient element.

With regard to resilient element 46, certain non-limiting embodiments include a plurality of stacked Belleville washers 52 which can be selected in number and properties in order to provide a desired level of resilience. Alternatively, resilient element 46 can include a diaphragm spring or the like.

Certain embodiments of tool assembly 31 can also optionally include other elements. For one, tool assembly 31 can include tool holder 56 mounted to proximal end 58 of rigid shaft 50 and/or shaft assembly 32. Tool holder 56 can be a standard or custom adapter or other device to facilitate attachment of tool assembly 31 to commercially available multi-axis computerized numerical control (CNC) machines (not shown). Tool holder 56 can additionally or alternatively facilitate attachment to other devices capable of steering tool assembly 31 while simultaneously applying sufficient (but not excessive) force in downward direction F to induce the desired compressive stresses.

Figure 4:
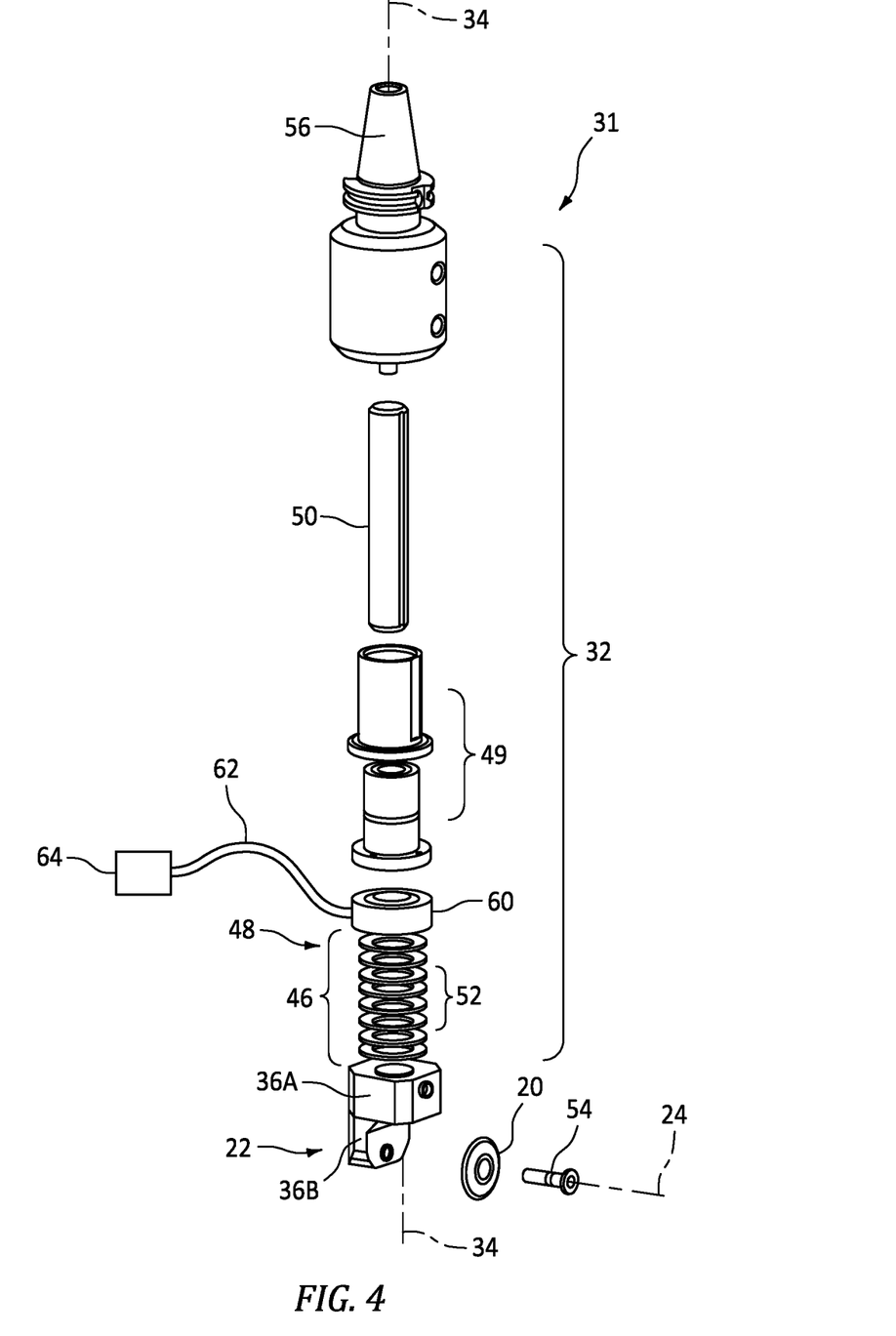
FIG. 4 is an exploded view of the deep rolling tool embodiment in FIG. 3.

In certain embodiments, tool assembly 31 can include load cell 60 to measure the force at the contact surface (see FIG. 4). Load cell 60 can optionally be disposed along axis 34 adjacent to resilient element 46, and can include a wired and/or wireless connection 62 for controller 64. This will be explained in more detail below.

FIG. 4 shows an exploded view of tool assembly 31 from FIG. 3. In addition to the elements described generally above, tool assembly 31 can include the following details. As noted, shaft assembly 32 is restricted to movement only along first axis 34. Thus, in this example embodiment, shaft assembly 32 can include linear bearing 48 arranged along axis 34 for supporting solid shaft 50. This simplifies determination of the downward force that needs to be applied in direction F, as any deflection away from that axis causes a reduction in the actual downward force vectors, while also applying unwanted transverse forces on the tool working surface.

In the example shown, hub 22 includes first and second portions 36A, 36B which form a right, or other, angle therebetween. Roller disk 20 is supported on a bearing or other device so that it is rotatable about axis 24. Here, with the right angle, axis 24 is perpendicular to first axis 34. In this example, working surface 26 of roller disk 20 is symmetrically crowned from a center to opposing first and second edges. Alternatively, working surface varies according to a desired load profile along the tool path and can include peaks, troughs, curves, etc.

Shaft assembly 32 can be calibrated before or between uses to provide a desired force concentration at working surface 26 of roller disk 20. In the example shown, at least one of solid shaft 50 and resilient element 46 can be calibrated so that the force applied to the tool in direction F (shown in FIGS. 2 and 3) and transmitted through roller disk 20 is sufficient to impart a residual compression stress in the workpiece at the first nonplanar surface (e.g. junction 16 in FIGS. 1 and 2).

The deep rolling tool described heretofore can be used in a number of different applications, depending on the required accuracy and precision of the applied forces needed. Success in some cases can be achieved by merely controlling the tool load within previously determined upper and lower bounds, such as through spring loading the tool and applying a target amount of compression to the spring. The compliance obtained by using a spring loaded tool enables an acceptable level of load control during processing but there is no record of what the actual contact stress was over the surface. However, this is the cheapest and often simplest option, where any suitable mechanical device with an ability to provide a controlled downward force can be used.

Some parts, however, require that the actual residual stresses at the working surface be verified. There are currently no non-destructive evaluation techniques that can be used to verify the correct level of residual stress was achieved during processing. Thus, a load cell or another feedback mechanism can be incorporated into the tool that allows monitoring and/or real-time adjustment of the force applied through the roller to the workpiece. The tool can process a part using multiple tool passes while maintaining the appropriate level of contact stress at the roller's point of contact. In some cases, the feedback is logged for quality control, so that it can be determined whether any irregularities occurred in the process. The load profile across the surface of the workpiece 10 can be varied. For example the load applied to the workpiece 10 surface can be a lower value initially proximate the edges of the workpiece 10 and then be a higher value across the workpiece 10 and then include a lower value as the roller nears the opposite edge of the workpiece 10 just prior to finishing the pass. The load can be applied in a consistent fashion across the surface of the workpiece 10 that is being DR treated. The load profile can be customized across the surface of the workpiece 10 by use of the position and force sensors, such as, load cell 60 and controller 64.

As was shown and described above, load cell 60 can optionally be incorporated into tool assembly 32. Load cell 60, in certain embodiments, is contiguous to resilient element 46 (e.g., plurality of Belleville washers 52), and enables real time monitoring of the applied load during processing. A deep rolling tool with an integral load cell thus enables verification of a key process parameter, roller load, which is critical for quality control in many production environments.

Process consistency could be further enhanced by using the load cell for closed loop load control which improve the precision with which the load could be maintained. Such a system would be much more tolerant of dimensional variability in the components being processed. It will also ensure that there are no micro-cracks on surface due to inadvertent localized application of intensive pressure.

Load cell 60 can be in wired or wireless communication with a controller 64 and/or monitor adapted to receive wired or wireless signals corresponding to an instantaneous load on resilient element 46.

Controller/monitor 64 can include closed-loop feedback logic, by which it can be adapted to vary a force applied in direction F (see also FIGS. 2 and 3) on tool assembly 31, along axis 34. Operating load cell 60 can generate signals corresponding to an instantaneous load on resilient element 46. The magnitude of the force can be based at least in part on one or more of the signals received from and generated by load cell 60. The applied force is varied based on a plurality of signals from load cell 60 to impart a substantially equal residual compression stress in the workpiece along a tool rolling path on the first nonplanar surface. In an exemplary embodiment, a high speed camera 66 can be utilized as a vision sensor to check any anomalies and integrate decision making algorithms in the robot controller 64 for direct adjustment of DR parameters or DR path for correcting the system.

The nature of many tools for CNC machines requires that they be axisymmetric (generally to facilitate rotation of the tool working end). Thus CNC programming and many common subroutines are generally tailored to this expectation. In contrast, the non-axisymmetric nature of tool assembly 31 can require that the CNC machine be provided with more complex programming even for some relatively simple tool paths. Depending on the desired tool paths and number of passes, programming and use of a CNC machine may be unnecessary or prohibitively complex, in which case, tool assembly 31 can be mounted to a different machine to apply the desired force over the contact path. While certain processes can generally be performed using a specialized tool in a conventional CNC milling machine, the deep rolling tool can be inconsistent with generic subroutines and tool paths used to manipulate conventional axisymmetric tools. Therefore use of the deep rolling tool, which is not axisymmetric, has additional path programming constraints. While planar surfaces can be processed by the deep rolling tool using a 3-axis CNC machine, more complex geometry components will require at least a 5-axis machine and in some instances a 6-axis machine may be necessary. Maintaining the normality and orientation constraints for deep rolling of complex component geometries can be challenging as the tool path programming software won't automatically satisfy these required constraints. While creative programming can generally overcome these issues it may require an experienced and highly skilled programmer.

Figure 5:
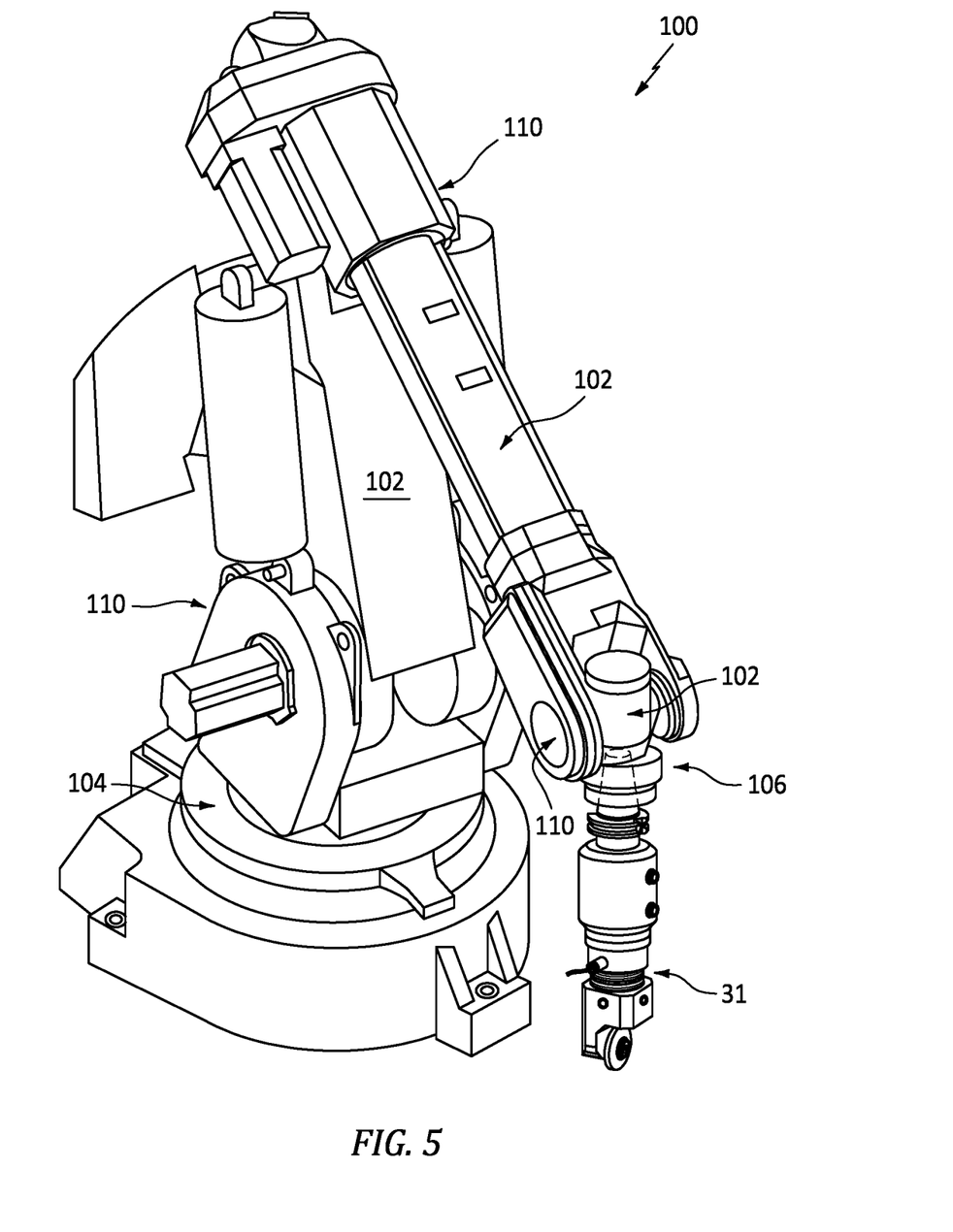
FIG. 5 shows an embodiment of a deep rolling tool attached to a robot arm for accessing difficult to process areas of a workpiece with the deep rolling tool.
Figure 6:
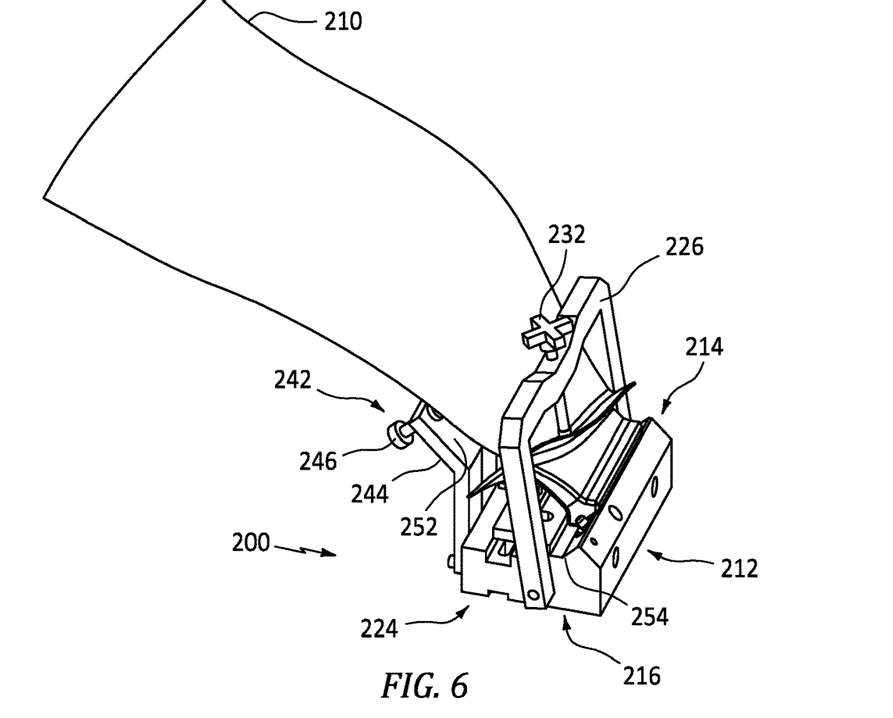
FIG. 6 is an isometric view of an exemplary fixture with a fan blade mounted.
Figure 7:
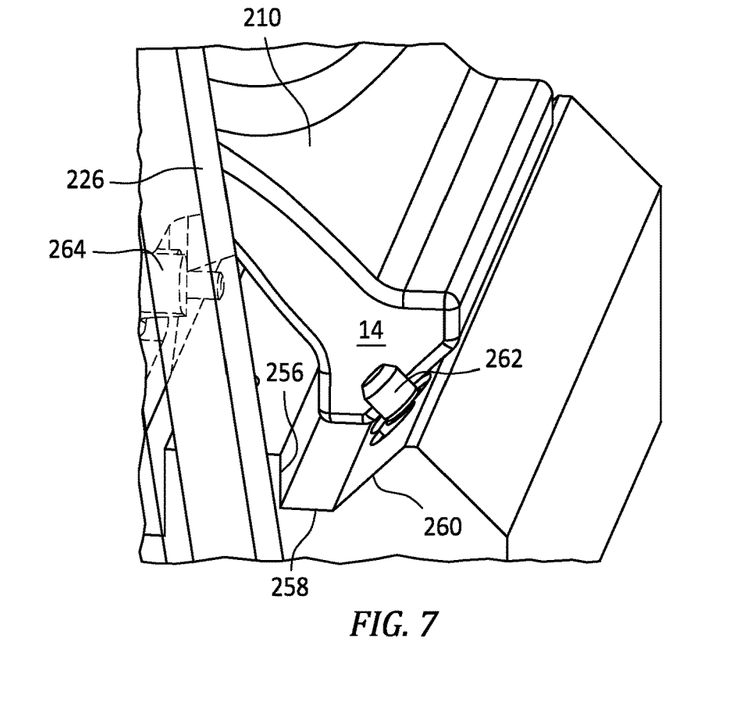
FIG. 7 is a detailed view of the exemplary fixture with a fan blade mounted.
Figure 8:
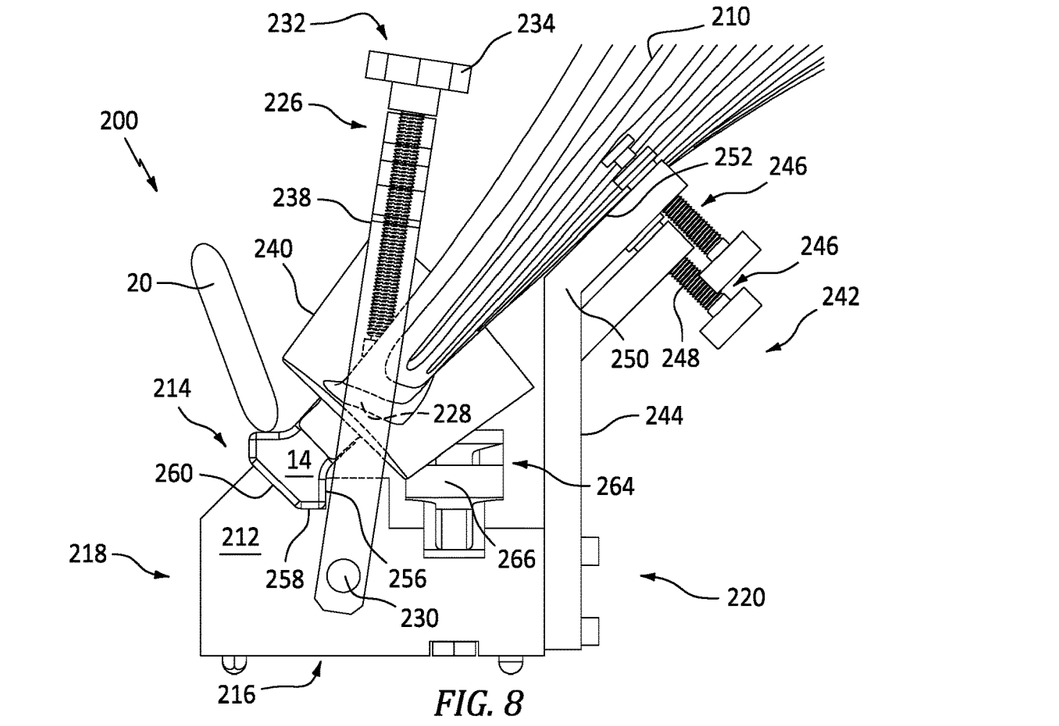
FIG. 8 is a side view of the exemplary fixture with fan blade mounted.
Figure 9:
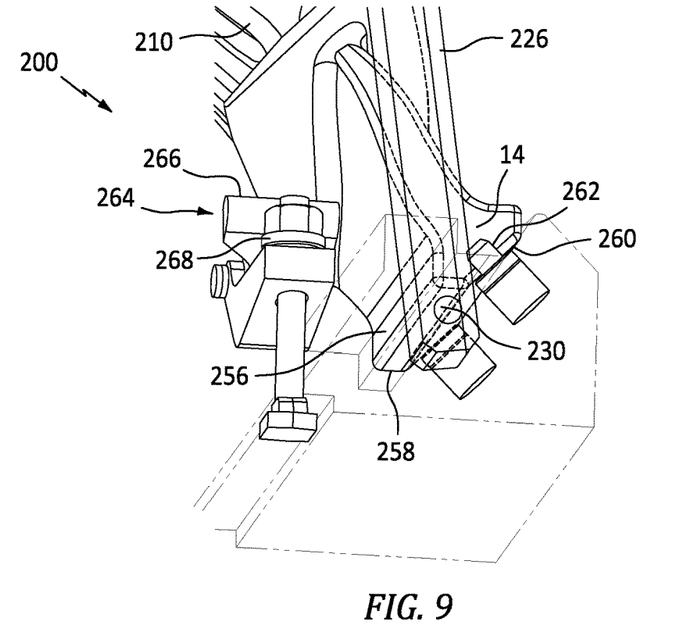
FIG. 9 is a side view of the exemplary fixture with fan blade mounted.
Figures 10, 11:
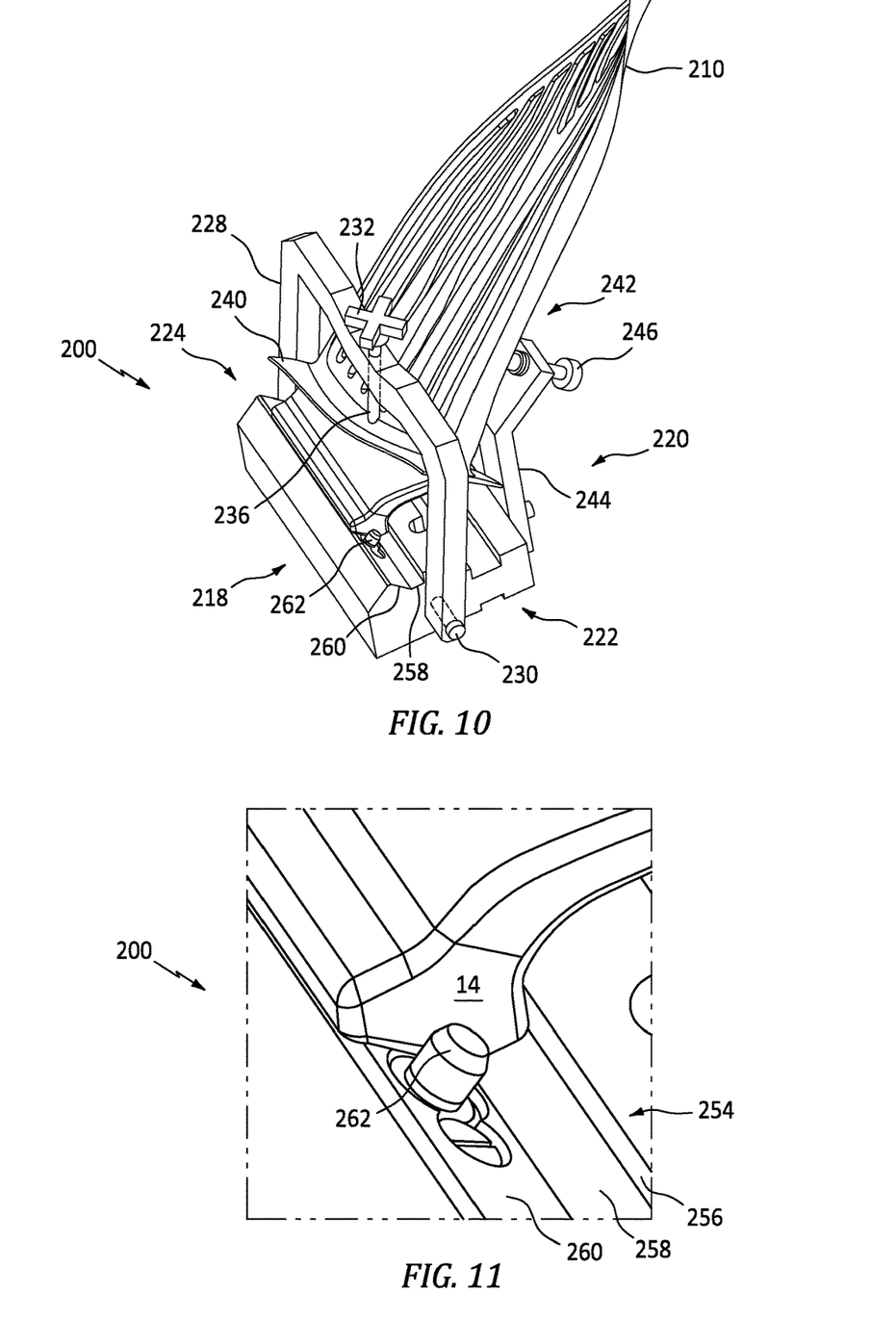
FIG. 10 is an isometric view of the exemplary fixture with fan blade mounted.
FIG. 11 is isometric view of a detail in the exemplary fixture with fan blade mounted.
Figure 12:
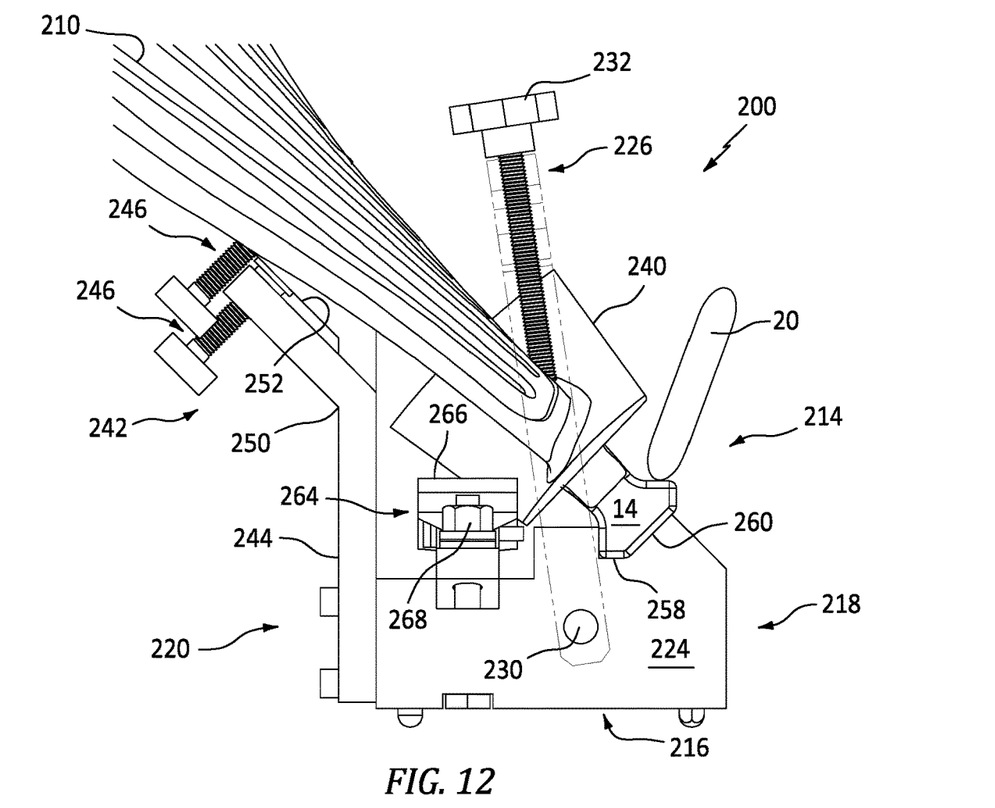
FIG. 12 is a side view of the exemplary fixture with fan blade mounted.
Figure 13:
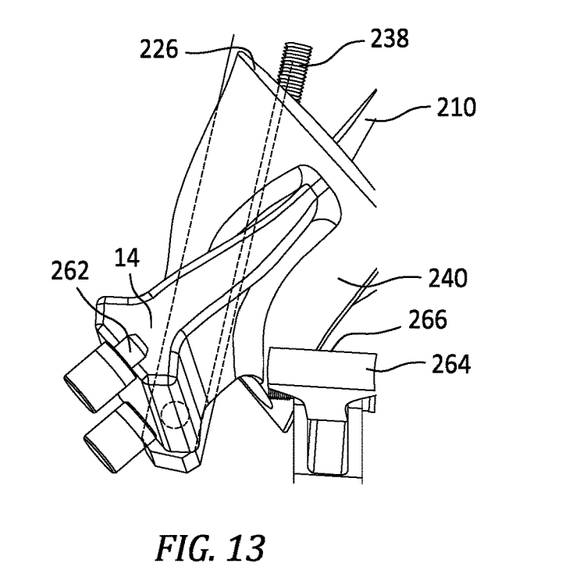
FIG. 13 is a side view of the exemplary fixture with fan blade mounted.

To overcome this, deep rolling tool assembly 31 can be attached to the end of a robotic arm 100 as shown in FIG. 5. Robotic assembly 100 can include, for example, a plurality of linear arms 102 connected in series between base end 104 and working end 106. Adjacent ones of arms 102 can be connected via a corresponding plurality of multi-axis joints 110 such that working end 106 is articulated by movement of one or more of arms 102 relative to one or more of multi-axis joints 110.

Operation of a robotic assembly such as assembly 100 in FIG. 5 can include using it to apply a downward force over a rolling path of non-axisymmetric deep rolling tool assembly 31. The downward force is applied to a proximal end of a spring-loaded tool shaft (best seen in FIG. 2) aligned with a first axis, such that the downward force is transferred through the shaft to a hub disposed at a distal end of the shaft assembly (also best seen in FIG. 2). In certain embodiments, robotic assembly 100 is sufficiently programmed and/or controlled to provide the appropriate instantaneous feedback of downward force, and the resilient element in tool 31 can be modified or omitted as needed.

As described above, the transferred downward force is transmitted from an upper portion of the hub aligned with the first axis to a lower portion of the hub parallel to a second axis. The second axis forms a nonzero angle relative to the first axis, about which a roller disk is supported by one or more bearings. A resulting compressive force is applied to the first nonplanar surface of the workpiece via a working surface of the roller disk.

A robot arm has more degrees of freedom than a 5-axis milling machine which facilitates processing of complex geometry parts. Current commercially available robot arms have been developed to the point where they can withstand the combination of high loads and precision required in deep rolling applications. The software for controlling robot arms is different to that for CNC milling machines and is more suited to maintaining the required orientation constraints of a multi-axis deep rolling tool. Also, it is easier to accommodate processing of large components using a robot arm, as the part does not have to fit inside the machine as it does with a milling machine.

Referring also to FIG. 6 through FIG. 13 a fixture 200 is shown with the workpiece, such as a hollow fan blade or simply fan blade 210 mounted. The fixture 200 includes a body 212. The body 212 includes an upper region 214 opposite a lower region 216. The body 212 includes a front 218 and a rear 220 opposite the front 218. The body 212 includes a right side 222 and a left side 224 opposite the right side 222.

The fixture 200 includes a pivot clamp 226 attached to the body 212. The pivot clamp 226 includes an arm 228 that attaches to the body 212 about a pivot 230. In an exemplary embodiment the arm 228 can be a C-shape design that can attach to the right side 222 and the left side 224 at pivot 230 on each side as shown.

The pivot clamp 226 includes an adjustable clamp 232. The adjustable clamp 232 can be threaded and adjustably mounted through the arm 228. In an exemplary embodiment, other mechanical techniques can be employed to adjust the adjustable clamp 232, such as latches, levers, set screws and the like. The adjustable clamp 232 can translate linearly relative to the arm 228 by use of rotary motion via the threaded connection with the arm 228. The adjustable clamp 232 includes a hand knob 234 and a surface contactor 236 opposite the hand knob 234 along a shaft 238 of the adjustable clamp 232. The hand knob 234 can be manipulated to rotate the shaft 238. The adjustment of the adjustable clamp 232 can move the surface contactor 236 relative to the fan blade 210 to secure the fan blade 210 to the fixture 200.

The surface contactor 236 is configured to press against a portion of the fan blade 210 to secure the fan blade 210. In an exemplary embodiment the surface contactor 236 can press against the fan blade 210 proximate a platform 240 of the fan blade 210. The pivot clamp 226 can be moved relative to the pivot 230 such that the pivot clamp 226 can swing to allow for access to the upper region 214 of the fixture 200. The fan blade 210 can be installed or manipulated, such as being rotated for further processing. The pivot clamp 226 can be released allowing for the fan blade 210 to be moved and then secured to hold the fan blade 210 in place.

The fixture 200 includes a support 242 for maintaining the fan blade 210 secured. The support 242 can include at least one brace 244 coupled to the rear 220 of the body 212. The support 242 can extend upward relative to the upper region 214 to engage the airfoil 12 portion of the fan blade 210. In the exemplary embodiment shown, there are a pair of braces 242 that each include an adjustable strut 246. The brace 244 can be interchangeable with an alternative brace 244 with differing dimensions or shapes adapted for use with different fan blade 210 designs. In an exemplary embodiment the adjustable strut 246 can include a threaded shaft 248 that engages the brace 244 to translate by use of rotary motion and the threads formed in the strut 246 and brace 244. It is contemplated that other mechanisms can be employed to translate the shaft 248 relative to the strut 246, such as latches, levers, set screws, ratchet, detent ball and cavity, telescopic friction fittings and the like. The support 242 is shown with the struts 246 having a bend 250 that allows for a face 252 of the strut 246 to be approximately parallel to the airfoil 12, to enable the shaft 248 to be approximately perpendicular to the airfoil 12. The adjustable strut 246 allows for more precise adjustment and support of the fan blade 210. The support 242 helps to prevent unwanted deflection of the fan blade 210, especially along a length of the airfoil 12.

The fixture 200 includes a receiver 254 located in the upper region 214. The receiver 254 is configured to accept the root 14 of the fan blade 210. The receiver 254 includes a first landing 256, a second landing 258 and a third landing 260. Each of the landings 256, 258 and 260 can be configured to match a portion of the root 14 to provide adequate surface to support the root 14 of the fan blade 210 while the deep rolling process is conducted on the exposed portion of the root 14 opposite the receiver 254. The landings 256, 258, 260 can be configured as planar surfaces. In exemplary an embodiment landings 256, 258, 260 can include a convex or concave surface structure designed to match the corresponding exterior surface of the root 14. The receiver 254 allows for the fan blade 210 to be removed and rotated so that the untreated surfaces of the root 14 can be processed by DR. The landings 256, 258, 260 can extend across the width of the upper region 214 from the right side 222 to the left side 224. The receiver 254 includes a lug 262 that extends outward to brace the root 14. The lug 262 can extend from the third landing 260. The lug 262 can be adjustable, able to be moved to accommodate various sizes/positions of root 14. The lug 262 is configured to secure the fan blade 210 in the receiver 254. The lug 262 can include mechanisms to adjust and move including a threaded shaft, latches, friction fitting, and the like.

The fixture 200 can include a shoulder 264 attached to the upper region 214. The shoulder 264 is configured to support the platform 240 portion of the fan blade 210. The shoulder 264 can be located in the upper region 214 between the receiver 254 and the support 242. The shoulder 264 can include a jaw structure 266 that is contoured to match the perimeter shape of the platform 240 of the fan blade 210. The shoulder 264 can provide support of the fan blade 210 against the forces applied by the pivot clamp 226, such that the fan blade 210 is secured between the pivot clamp 226 on one side and the shoulder 264 and the receiver 254 and the brace 244 on the opposite side of the fan blade 210. The shoulder 264 can be adjusted by use of fasteners 268 secured to the body 212. In an exemplary embodiment, the fasteners 268 can include mechanisms to adjust and move including a threaded shaft and nuts, latches, friction fitting, and the like.

The fixture 200 is configured to mount and secure the fan blade 210 in a position that allows access of the working surface 26 to the fan blade 210 in the absence of unwanted contact to the fan blade 210. The fixture 200 is configured to easily dismount the fan blade 210 and allow for the manipulation of the fan blade 210 to rotate the fan blade 210 and access surfaces for the DR process.

A technical advantage of the disclosed system can include a force controller sensor that can apply constant normal load to the surfaces being treated.

Another technical advantage of the disclosed system can include a special design fixture to accommodate for the hollow fan blade flexibility during rotation and manipulation of the hollow fan blade.

Another technical advantage of the disclosed system can include a fixture including multiple features to ensure easy positioning of the hollow fan blade and eliminate lengthy set-up and adjustment.

Another technical advantage of the disclosed system can include the roller tool being designed and checked for any collision with the hollow fan blade surfaces.

Another technical advantage of the disclosed system can include the capacity for a high system repeatability of the surface finish produced that is within design specifications.

Another technical advantage of the disclosed system can include the utilization of high a speed camera as a vision sensor to check any anomalies and integrate decision making algorithms in the robot controller for direct adjustment of DR parameters or DR path for correcting the system.

There has been provided a system for deep rolling. While the system for deep rolling has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:
1. A system for deep rolling a fan blade comprising:
a shaft assembly disposed along a first axis;
a hub connected to a distal end of the shaft assembly, the hub having an upper hub portion adjacent to the distal end of the shaft assembly aligned with the first axis, and a lower hub portion extending along a second axis, the second axis forming an angle relative to the first axis;
a roller disk joined to the lower portion of the hub, the roller disk configured to contact a fan blade;
a fixture supporting said fan blade;

the fixture comprising:
a body supporting a pivot clamp, the pivot clamp attached to the body with a pivot;
a support attached to the body, the support is configured to engage an airfoil portion of the fan blade;
a receiver formed in the body configured to support a root of the fan blade; and
a shoulder attached to the body configured to support a platform portion of the fan blade.

2. The system for deep rolling a fan blade according to claim 1, wherein the pivot clamp includes an adjustable clamp, the adjustable clamp being adjustably mounted through an arm of the pivot clamp attached to the pivot.

3. The system for deep rolling a fan blade according to claim 1, wherein the support extends upward relative to an upper region of the body to engage the airfoil portion of the fan blade; the support includes at least one brace coupled to a rear of the body, the at least one brace includes an adjustable strut.

4. The system for deep rolling a fan blade according to claim 1, wherein the receiver includes at least one landing configured to support a corresponding portion of the root.

5. The system for deep rolling a fan blade according to claim 4, further comprising a lug that extends outward from the receiver to brace the root.

6. The system for deep rolling a fan blade according to claim 1, wherein the shoulder is located in an upper region of the body between the receiver and the support.

7. The system for deep rolling a fan blade according to claim 1, wherein the adjustable clamp includes a hand knob and a surface contactor opposite the hand knob along a shaft of the adjustable clamp; wherein the surface contactor is configured to press against a portion of the fan blade to secure the fan blade.

8. A system for deep rolling a fan blade comprising:
a shaft assembly disposed along a first axis;
a hub connected to a distal end of the shaft assembly, the hub having an upper hub portion adjacent to the distal end of the shaft assembly aligned with the first axis, and a lower hub portion extending along a second axis, the second axis forming an angle relative to the first axis;
a roller disk joined to the lower portion of the hub, the roller disk configured to contact a fan blade;
a fixture supporting said fan blade;
the fixture comprising:
a body including an upper region opposite a lower region, the body includes a front and a rear opposite the front, the body includes a right side and a left side opposite the right side;
the body supports a pivot clamp, the pivot clamp attaches to the body with a pivot attached to the body;
a support attached to the body, the support includes at least one brace coupled to the rear of the body, the support is configured to engage an airfoil portion of the fan blade;
a receiver formed in the body configured to support a root of the fan blade, wherein the receiver includes at least one landing configured to support a corresponding portion of the root; and
a shoulder attached to the body configured to support a platform portion of the fan blade; wherein the shoulder is located in an upper region of the body between the receiver and the support.

9. The system for deep rolling a fan blade according to claim 8, wherein the pivot clamp includes an adjustable clamp, the adjustable clamp being adjustably mounted through an arm of the pivot clamp attached to the pivot.

10. The system for deep rolling a fan blade according to claim 9, wherein the adjustable clamp includes a knob and a surface contactor opposite the knob along a shaft of the adjustable clamp.

11. The system for deep rolling a fan blade according to claim 10, wherein the surface contactor is configured to press against a portion of the fan blade to secure the fan blade.

12. The system for deep rolling a fan blade according to claim 8, wherein the at least one brace includes an adjustable strut.

13. The system for deep rolling a fan blade according to claim 8, further comprising:
a lug that extends outward from the receiver to brace the root.

14. A process for securing a fan blade for deep rolling comprising:
supporting the fan blade in a fixture, the fixture comprising:
a body supporting a pivot clamp, the pivot clamp attached to the body with a pivot;
engaging an airfoil portion of the fan blade with a support attached to the body;
supporting a root of the fan blade with a receiver formed in the body; and
supporting a platform portion of the fan blade with a shoulder attached to the body.

15. The process of claim 14, wherein the pivot clamp includes an adjustable clamp, the adjustable clamp being adjustably mounted through an arm of the pivot clamp attached to the pivot.

16. The process of claim 14, further comprising:
supporting a portion of the root with at least one landing formed in the receiver.

17. The process of claim 14, further comprising:
bracing the root of the fan blade with a lug that extends outward from the receiver.

18. The process of claim 14, wherein the adjustable clamp includes a knob and a surface contactor opposite the knob along a shaft of the adjustable clamp.

19. The process of claim 18, further comprising:
pressing the surface contactor against a portion of the fan blade to secure the fan blade.

20. The process of claim 14, wherein the support includes at least one brace coupled to a rear of the body, wherein the at least one brace includes an adjustable strut; and
adjusting the adjustable strut to contact the airfoil portion of the fan blade.

* * * * *